(12) United States Patent
Kull (10) Patent No.: US 6,189,980 B1
(45) Date of Patent: Feb. 20, 2001

(54) LOCOMOTIVE TO ECP BRAKE CONVERSION SYSTEM

(75) Inventor: Robert C. Kull, Olney, MD (US)

(73) Assignee: Westinghouse Air Brake Company, Wilmerding, PA (US)

( * ) Notice: Under 35 U.S.C. 154(b), the term of this patent shall be extended for 0 days.

(21) Appl. No.: 09/215,985

(22) Filed: Dec. 18, 1998

(51) Int. Cl.$^7$ .................................................. B60T 13/00
(52) U.S. Cl. .................................................. 303/7; 303/15
(58) Field of Search ............................. 303/7, 3, 15, 20, 303/28, 9, 9.61, 86, 16, 81, 17, 8, 25, 13, 14, 40, 47

(56) References Cited

U.S. PATENT DOCUMENTS

| | | | |
|---|---|---|---|
| 5,096,266 | * | 3/1992 | Skantar ................................ 303/86 X |
| 5,222,788 | * | 6/1993 | Dimsa et al. .......................... 303/15 |
| 5,638,276 | * | 6/1997 | Hart ...................................... 303/3 X |
| 5,873,638 | * | 2/1999 | Bezos .................................... 303/47 |
| 5,887,953 | * | 3/1999 | Wood et al. ............................ 303/7 |
| 5,927,327 | * | 7/1999 | Bezos et al. ........................... 303/3 X |
| 5,967,620 | * | 10/1999 | Truglio et al. .......................... 303/3 |

* cited by examiner

Primary Examiner—Christopher P. Schwartz
Assistant Examiner—Melanie Talavera (74) Attorney, Agent, or Firm—James Ray & Associates (57) ABSTRACT

A conversion system enables a locomotive equipped with a conventional pneumatic brake control system to control braking on a train whose railcars each have electrically controlled pneumatic (ECP) brake equipment. The conversion system includes a power conversion mechanism, a signal conversion mechanism and two pressure reduction circuits. The power conversion mechanism converts battery voltage received from a power trainline of the locomotive to a predetermined nominal voltage. Made available to an ECP trainline that runs along the railcars, the predetermined nominal voltage is used to power the ECP brake equipment on each railcar in the train. The signal conversion mechanism converts the pneumatic brake commands carried in the brake pipe of the locomotive into electrical brake commands corresponding thereto. Transmitted along the ECP trainline, the electrical brake commands control the ECP brake equipment on each railcar and the braking effort deliverable thereby. Part of the signal conversion mechanism, the first pressure reduction circuit is used to reduce the railcar brake pipe pressure to an emergency level when the brake pipe in the locomotive carries a pneumatic emergency brake command. The first pressure reduction circuit then pneumatically commands the ECP brake equipment to make an emergency brake application. The second pressure reduction circuit assures that the railcar brake pipe pressure reduces to the emergency level when the locomotive brake pipe pressure drops below a prespecified level.

23 Claims, 2 Drawing Sheets

LOCOMOTIVE TO ECP BRAKE CONVERSION SYSTEM

FIELD OF THE INVENTION

The invention relates to two basic types of brake control systems, both well known and widely used in the railroad industry: (1) the conventional brake control system by which a locomotive is able to control the brakes on railcars equipped with pneumatic brake equipment; and (2) an ECP based brake control system by which a locomotive is able to control the brakes on railcars equipped with electrically controlled pneumatic (ECP) brake equipment. More particularly, the invention pertains to a system that enables a locomotive equipped with the conventional brake control system to control the brakes on railcars equipped with the newer electrically controlled pneumatic (ECP) brake equipment.

BACKGROUND OF THE INVENTION

The following background information is provided to assist the reader to understand the invention described and claimed below. Accordingly, any terms used herein are not intended to be limited to any particular narrow interpretation unless specifically stated otherwise in this document.

Figure 1:
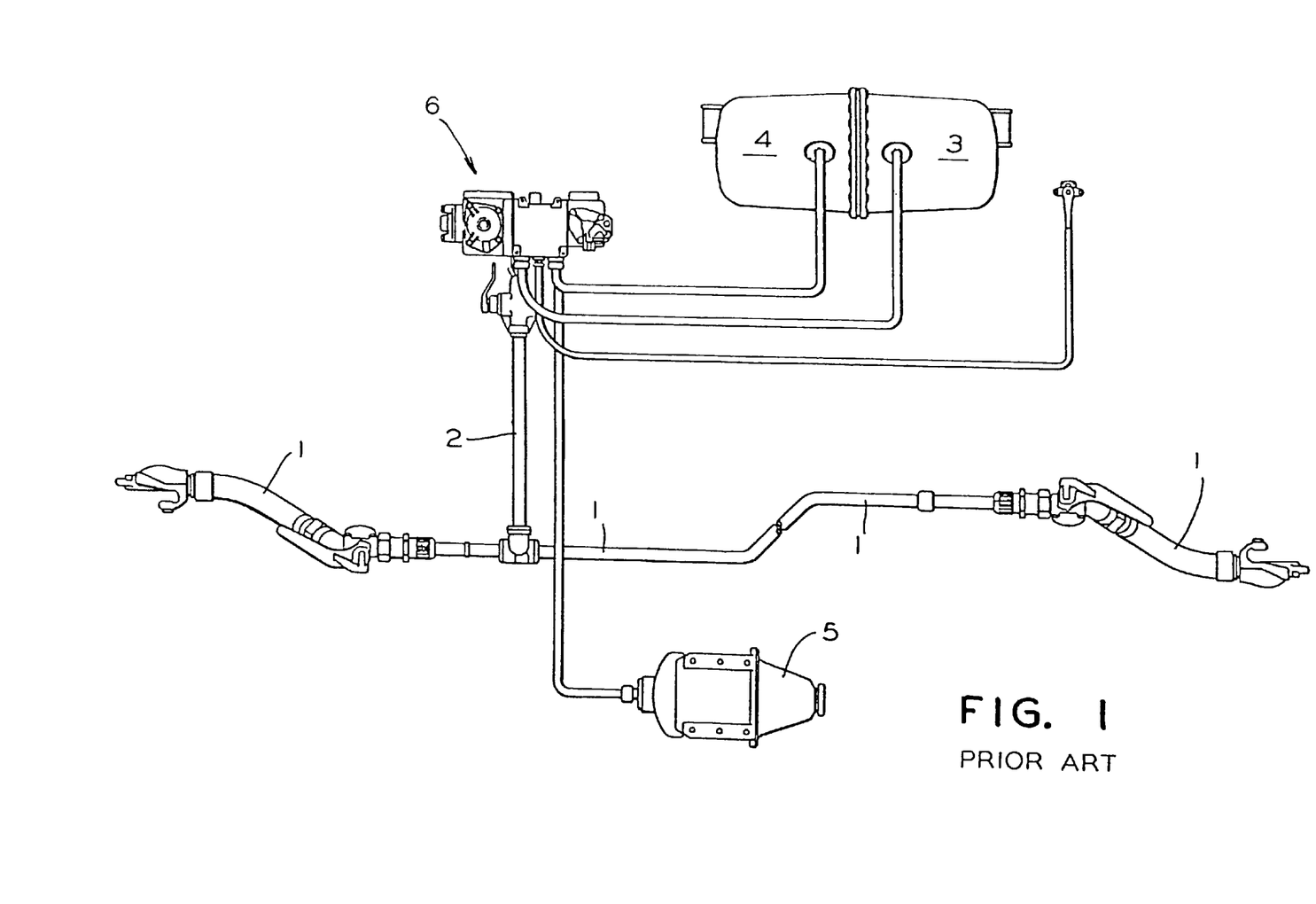
FIG. 1 is a schematic view of the pneumatic brake equipment typically found on a railcar of a freight train.

For a train headed by a locomotive equipped with the conventional brake control system, a pneumatic trainline known as the "brake pipe" is the only means by which service and emergency brake commands are conveyed to each of the railcars in the train. The brake pipe is essentially one long continuous tube that runs from the lead locomotive to the last railcar in the train. The brake pipe is actually composed of a series of interconnected pipe lengths, with one pipe length secured to the underside of each railcar. The brake pipe is formed by connecting each pipe length via a coupler to another such pipe length on an adjacent railcar. As shown in FIG. 1, it is to this brake pipe 1 that the pneumatic brake equipment on each railcar connects via a branch pipe 2.

The pneumatic brake equipment on each railcar includes two storage reservoirs 3 & 4, one or more brake cylinders 5 and at least one pneumatic brake control valve 6 such as an ADB, ABDX or ABDW type valve made by the Westinghouse Air Brake Company (WABCO). Under conditions known in the brake control art, the pneumatic brake control valve 6 charges the two reservoirs 3 and 4 with the pressurized air it receives from the brake pipe 1. It is the pressure level within the brake pipe 1 that determines whether the brake control valve 6 will indeed charge these reservoirs or deliver pressurized air previously stored in one or both of these reservoirs to the brake cylinders 5. When so pressurized, the brake cylinders 5 convert the pressurized air that they receive from the brake control valve 6 to mechanical force. From the brake cylinders this force is transmitted by mechanical linkage to the brake shoes. The magnitude of the braking force applied to the wheels is directly proportional to the pressure built up in the brake cylinders. Forced against the truck wheels and/or disc brakes, the brake shoes are used to slow or stop the rotation of the wheels. For trains equipped with the conventional brake control system, it is thus the pressure level in the brake pipe 1 that determines whether and to what extent the railcar brakes will be applied.

In addition to the brake pipe, the locomotive has its own pneumatic trainlines including a main reservoir equalizing (MRE) pipe, an independent application and release (IAR) pipe, and an actuating pipe. Within a locomotive consist (i.e., two or more locomotives connected together), the MRE, actuating and IAR pipes of each locomotive connect to the MRE, actuating and IAR pipes of adjacent locomotives. The MRE pipe is used to charge the brake pipe to a normal operating pressure of approximately 90 psi when the brakes are released. Incidentally, it is the pressure within the IAR pipe that controls the delivery of pressurized air to, and thus the operation of, the brakes of the locomotive(s) in the train.

The locomotive also features a multi-wire electrical trainline known as the multiple unit (MU) line cable. The MU line cable consists of twenty seven (27) different electrical lines. As is well known in the railroad industry, the MU line cable contains an alarm line on which the locomotive equipment can convey various signals to alert the train operator of critical conditions occurring in the locomotive. The MU line cable also contains 74V dc power and return lines on which battery power from the locomotive is supplied to the various power consuming devices on the train.

There are many different types of conventional brake control systems in use in the railroad industry. An example of one type of conventional brake control system is the 26-L Locomotive Air Brake Control System manufactured by WABCO. A conventional brake control system, such as the 26-L System, has two brake handles referred to as the automatic and independent brake handles. By placing these handles into the appropriate positions, a train operator in the locomotive can control how the brakes on the locomotive(s) and railcars operate. More specifically, by moving these handles into the proper position, the train operator can control how much pressure will be developed in the IAR and brake pipes, as well as in the other pneumatic trainlines of the train. It is by such control of the pressure level in the brake pipe 1, for example, that the pneumatic brake equipment on each railcar is controlled.

By moving the independent brake handle, the train operator can direct the conventional system only to apply or release the brakes on the locomotive(s). In contrast, by moving the automatic brake handle, the operator can direct the brake control system to apply or release the brakes on both the locomotive(s) and railcars in the train. The level to which the system reduces or increases pressure within the brake pipe 1, and thus the amount of braking power exerted by the train brakes, ultimately corresponds to the position of the automatic brake handle. The automatic brake handle can be moved from and in between a release position at one extreme (in which brake pipe pressure is maximum and the brakes are completely released) to an emergency position at another extreme (in which brake pipe pressure is zero and the brakes are fully applied).

The positions for the automatic brake handle include release, minimum service, full service, suppression, continuous service, and emergency. Between the minimum and full service positions lies the service zone wherein each incremental movement of the automatic brake handle toward the full service position causes an incremental reduction in brake pipe pressure. The exact amount by which the brake pipe pressure is reduced depends on how far towards the full service position the brake handle is moved. It is this reduction in pressure that signals the pneumatic brake control valve(s) 6 on each railcar to supply pressurized air from one or both reservoirs to the brake cylinders so as to apply the railcar brakes. The amount of pressure built up in the brake cylinders, and thus the magnitude of the braking force applied to the wheels, is proportional to the amount by which the brake pipe pressure has been reduced.

When the automatic brake handle is moved from within the service zone or above towards the release position, the way in which the brakes operate depend on whether the brake equipment has been designed to allow a graduated release of the brakes. Passenger trains typically feature brake equipment that allows a graduated release of the brakes when the locomotive brake control system is set in the "passenger service" mode of operation. Freight train brake equipment, in contrast, typically permits only a direct release of the brakes.

For direct release equipment, in response to such movement of the automatic brake handle, the brake control system does not command an increase in the pressure within the brake pipe 1 until the automatic brake handle is placed in the release position. Once the pressure in the brake pipe increases above a preset level (e.g., 2 psi), the control system and the railcar brake control valves it affects respond by completely venting the brake cylinders thereby fully releasing the train brakes.

For graduated release equipment, in response to such movement of the automatic brake handle toward the release position, the brake control system commands an increase in the pressure in the brake pipe incrementally. The level to which the brake pipe pressure rises is dependent on the extent to which the automatic brake handle is moved toward the release position. Unlike the locomotive brake control system and pneumatic brake control valves for direct release equipment, those designed for graduated brake release react to this incremental rise in brake pipe pressure by reducing proportionately the pressure in the brake cylinders thereby reducing the force with which the train brakes are applied.

For a train headed by a locomotive equipped with the newer ECP based brake control system, brake commands are primarily conveyed to each of the railcars electrically via a two wire ECP trainline. Specifically, both service and emergency brake commands are communicated electrically via this ECP trainline to the ECP brake equipment on each railcar in the train. The ECP brake equipment on each railcar is basically the same as the pneumatic brake equipment previously described, except for the pneumatic brake control valve 6. As is well known in the art, a car control unit (CCU), one or more pressure transducers and various pneumatic and electropneumatic valves are used in lieu of the pneumatic brake control valve. The pressure transducers are used to monitor pressure within the brake pipe and the brake cylinders as well as the pressure within the two reservoirs. Akin to the branch pipe 2 shown in FIG. 1, branch wiring is used to connect the CCU to the ECP trainline. Supplied from the 74V dc power line of the MU line cable in the locomotive, the ECP trainline operates at a nominal 230V dc to power the ECP brake equipment on each railcar.

For railcars equipped with ECP brake equipment, the brake pipe 1 still serves as the source of pressurized air from which to charge the reservoirs 3 & 4 on each railcar. During service and emergency braking, it is still from one and both reservoirs, respectively, that pressurized air is delivered to the brake cylinders 5 to apply the railcar brakes. In the ECP brake control system, however, the brake pipe is not used to convey service brake commands. It is used only to convey emergency brake commands as a pneumatic backup to the electrical emergency brake commands conveyed along the ECP trainline. Should the ECP brake equipment lose power or otherwise fail electrically, it generally will respond pneumatically to an emergency pressure reduction in the brake pipe by supplying pressurized air from both reservoirs to the brake cylinders thereby causing an emergency application of the railcar brakes.

The ECP based brake control system in the locomotive includes a cab station unit and a master controller from which the brakes on the train are ultimately controlled. Inputs from handle(s) or push buttons are processed by the cab unit and then passed to the master controller. Operating according to instructions contained within its programming code, in response to these and other inputs, the master controller formulates a brake command appropriate to current conditions and transmits it along the ECP trainline to each of the vehicles in the train. The brake command and other ECP messages are transmitted over the ECP trainline via a powerline communications system such as the Echelon LonWorks System specified by the American Association of Railroads (AAR). The master controller can order through the brake command any action from a release of brakes to an emergency application of brakes or any degree of brake application in between those two extremes. The brake equipment may also be designed to provide graduated release of the brakes. The degree of brake application ordered by the master controller is typically conveyed in terms of a percentage of the pressure required for full service brake application. Zero percent (0%) is typically designated for a release of brakes, 15% for a minimum service brake application, 100% for a full service brake application and 120% for an emergency brake application.

Each CCU includes a transceiver device and a microprocessor unit. Controlled by the microprocessor unit, the transceiver is connected via the branch wiring to the ECP trainline from which it receives the electrical brake commands issued by the master controller. The transceiver converts the electrical brake command into a form usable by the microprocessor. In a manner well known in the brake control art, the microprocessor controls the aforementioned electropneumatic valves through which pressurized air can be supplied to or exhausted from the brake cylinders 5 on the railcar according to the dictates of the particular electrical brake command received.

The communications network on board an ECP based train is typically comprised of the master controller and powerline communication system in the lead locomotive and the CCU on board each railcar as well as the ECP trainline over which they communicate. The master controller is responsible for most of the communication over the ECP trainline in that it broadcasts the most recently formulated brake command to all railcars in the train. The master controller also polls the railcars at a predetermined rate (e.g., every second). Each CCU has its own unique identification code that it transmits to the locomotive when polled by, and reporting information about its operations to, the master controller. Specifically, sequentially or according to other criteria, the master controller sends a status query addressed to one railcar to determine whether the selected CCU is attentive to the brake control system. When so queried, a selected CCU will normally respond to the interrogation unless it has lost the ability to communicate which in itself provides an indication of its status to the master controller. Taking the form of the identification code, the response to the query also typically includes other ECP operational data such as brake pipe pressure, brake cylinder pressure, battery voltage, reservoir pressure(s) and whether the brakes on the railcar or one of its trucks are cut-in (enabled) or cut out (disabled). By its response, the selected CCU informs the master controller that it is a properly operating part of the ECP brake control system. Separate from the polling cycle, a CCU can send on its own initiative an alarm message. Each railcar via its CCU can thus report to the master controller critical data and other diagnostic information should any of the following conditions occur: improper brake cylinder pressure, failure of a reservoir to charge, abnormally low pressure in the brake pipe or in one of the reservoirs or failure to receive communications. The CCU may also issue specific control messages in response to various other circumstances as is well known in the brake control art.

Many trains, whether equipped with ECP or conventional brake control systems, are also rigged with any one of several known end-of-train (EOT) radio telemetry systems. These systems typically include a locomotive control unit (LCU) located in the locomotive and an EOT rear unit mounted to the last railcar in the train. The EOT unit is coupled to the brake pipe on the last railcar by means of a hose and a glad hand. In a one-way EOT system, the EOT unit transmits by radio signals to the LCU data pertaining to the pressure in the brake pipe and the motion of the last railcar. To accomplish this, the EOT unit includes a pressure transducer to monitor brake pipe pressure, a motion sensor to sense movement of the railcar, a microprocessor unit to control the overall operation of these components and a transmitter that the microprocessor unit uses to transmit this last railcar data. In the locomotive, the LCU includes a primary display, a receiver to receive transmissions from the EOT unit and a microprocessor unit. Controlled by the microprocessor unit, the display is used to convey the last railcar data to the train operator. Furthermore, in response to an emergency command transmitted by the EOT unit, the LCU will also display that an emergency condition exists at the rear of the train. The EOT unit is typically configured so that the emergency condition represents a sudden loss of brake pipe pressure or a drop in brake pipe pressure below a predetermined level.

For a train equipped with a one-way EOT system, the emergency brake application starts at the locomotive and progresses along the brake pipe to the last railcar. For long trains, reducing the pressure in the brake pipe from the head of the train can be quite time consuming, particularly for a train equipped with a conventional pneumatic brake control system. Moreover, if one of the angle cocks is left closed or the brake pipe is otherwise restricted, the brake equipment beyond the restriction may not receive the emergency brake command needed to apply the brakes in an emergency. For this reason, two-way EOT systems have been developed under the auspices of the AAR.

In a two-way EOT system such as the TRAINLIN® II EOT system manufactured by WABCO, the LCU and EOT unit still perform all of the functions attributed to their counterparts in the one-way EOT system. The EOT unit is thus still used to transmit the aforementioned radio signals by which last railcar brake pipe pressure and motion data is conveyed to the LCU. The twoway EOT and LCU units, however, are each equipped with a transceiver (i.e., combination transmitter and receiver) as compared to the single transmitter and receiver for the one-way EOT and LCU units, respectively. The EOT unit also has an emergency brake valve that is controlled by its microprocessor unit, and the LCU also includes an emergency toggle switch. By toggling this switch in an emergency, the train operator can cause the LCU to transmit an emergency brake radio signal to the EOT unit. By its microprocessor unit, the EOT unit responds to this emergency signal by commanding its emergency brake valve to reduce the pressure in the brake pipe at an emergency rate. Combined with the emergency reduction in brake pipe pressure initiated from the head end of the train using the aforementioned brake systems, the two-way EOT system allows an even faster application of the railcar brakes in an emergency.

In this two-way EOT system, the LCU has a primary display panel which features a dedicated display for each of several types of last railcar data. The last railcar data displayed includes brake pipe pressure, low battery condition, whether the railcar is stopped or in motion, and whether an emergency has been enabled or disabled. The LCU also has a supplemental message display by which it visually conveys additional information such as, for example, data related to arming of the EOT system and whether or not the EOT unit and LCU are communicating properly.

For a train equipped with a conventional pneumatic brake control system wherein the brake pipe is used to pneumatically convey both service and emergency brake commands to the railcars, another EOT radio telemetry system, such as the TRAINLINK® ES system manufactured by WABCO, may be used. It is, of course, well known that an emergency application is initiated at a rate much faster than a service application. Typically, the emergency reduction in pressure propagates along the brake pipe at a speed of approximately 900 feet/sec. Consequently, for a one mile long train, the propagation time would be in the range of 10 to 15 seconds. In contrast, a service application can take well over a minute to reach the last railcar; hence the need for, and development of, the TRAINLINK® ES system.

In addition to the two-way LCU and EOT units, the TRAINLINK® ES system has a Service Interface Unit (SIU) that connects between the serial port of the ES LCU and the brake pipe on the locomotive. The SIU provides the ES LCU with the current brake pipe pressure. This allows the ES LCU to automatically initiate a service brake application at the last railcar simultaneously with the service reduction in brake pipe pressure initiated from the locomotive. Specifically, the ES LCU in the locomotive automatically transmits a service brake radio signal to the ES EOT unit when it detects a service reduction in brake pipe pressure via the SIU. By its microprocessor unit, the two-way ES EOT unit responds to this service brake signal by commanding its valve to reduce the brake pipe pressure from the last railcar at the same service rate as that ordered by the brake control system in the lead locomotive at the head of the train. A service application of the brakes can thus be made much faster on a train equipped with a TRAINLINK® ES or similar type EOT system. Using the SIU, the ES LCU can also automatically transmit an emergency brake signal when an emergency reduction in brake pipe pressure has been initiated by the brake control system in the locomotive. The emergency toggle switch on the ES LCU can also be used to transmit this emergency brake signal.

Lead by the American Association of Railroads (AAR), the railroad industry, particularly for freight trains, is encouraging the development of the newer ECP based brake control systems. This is because ECP brake control systems perform far better, and are far more capable, than their older pneumatic counterparts. An ECP based system, for example, can apply and release the railcar brakes much faster than any of the conventional pneumatic brake control systems. For a conventional system, the speed at which the brakes react is relatively slow as it takes time, especially for long freight trains, for the pneumatic brake commands to propagate the length of the brake pipe. For an ECP based system, the speed at which the brakes react is much faster as the brake commands are conveyed electrically to the railcars. Furthermore, unlike railcars equipped with conventional pneumatic brake equipment, railcars equipped with ECP brake equipment communicate with the locomotive. Not only does it act upon the electrical brake commands received from the master controller, the ECP brake equipment on each railcar also reports to the locomotive the aforementioned ECP data (i.e., data about its own operations).

As the railroad industry converts to ECP based brake control systems, it faces several logistical problems typical of such transitions. The first ECP equipped trains put in operation have typically been limited to operating as "unit trains" (i.e., a group of railcars each equipped with ECP brake equipment and operated as a single train). Most of the larger railroad operating authorities, however, are not able to dedicate a locomotive solely to a particular unit train. For a railroad authority to operate a unit train on a consistent basis, it would need to equip a large number of its locomotives with ECP brake control systems. Further complicating matters is that a given unit train must often travel over several territories each operated by a different railroad authority. Consequently, a given unit train may be hauled by several different locomotives en route to its destination.

OBJECTIVES OF THE INVENTION

It is, therefore, a primary objective of the invention to provide a conversion system that enables a locomotive equipped with a conventional pneumatic brake control system to control the brakes on railcars equipped with the newer electrically controlled pneumatic (ECP) brake equipment.

Another objective of the invention is to provide such a conversion system as a portable unit, one that can be installed either in the last locomotive in a locomotive consist or in the first railcar in an ECP unit train.

Yet another objective is to provide a basic version of the invention in which the conversion system is configured to operate on a train without taking full advantage of all of the communication capabilities that the end-of-train (EOT) radio telemetry system on the train has to offer.

Still another objective is to provide an enhanced version of the invention in which the conversion system is configured to operate on a train equipped with an end-of-train (EOT) radio telemetry system so that ECP related data can be more readily conveyed to the train operator.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the following drawings and claims.

SUMMARY OF THE INVENTION

The invention provides a conversion system for enabling a locomotive equipped with a conventional brake control system to control braking on railcars having electrically controlled pneumatic (ECP) brake equipment. The conversion system includes two pressure transducers, a pressure regulating mechanism, a dc—dc converter, a controller unit and two pressure reduction circuits. The first pressure transducer is used to convert pressure within the brake pipe on the locomotive to a first feedback signal indicative of locomotive brake pipe pressure. The second pressure transducer is used to convert pressure within the brake pipe on the railcars to a second feedback signal indicative of railcar brake pipe pressure. The pressure regulating mechanism is used to regulate to a predetermined nominal pressure the air that is supplied to the brake pipe of the railcars by a main reservoir pipe on the locomotive. The dc—dc converter is used to convert the battery voltage received from a power line on the locomotive to a predetermined nominal voltage with which to power an ECP trainline on the railcars. Operating according to instructions contained within programming code, the controller unit monitors the first and second feedback signals received from the pressure transducers, controls the dc—dc converter and converts pneumatic brake commands conveyed by the brake pipe on the locomotive into electrical brake commands corresponding thereto for transmission along the ECP trainline. It is through these electrical brake commands that the ECP brake equipment on each railcar, and thus the braking effort deliverable thereby, is controlled. Activatible by the controller unit, the first pressure reduction circuit is used to reduce the railcar brake pipe pressure to an emergency level. When a pneumatic emergency brake command appears in the brake pipe on the locomotive, the controller unit (i) activates the first pressure reduction circuit and (ii) transmits an electrical emergency brake command along the ECP trainline, thereby commanding both pneumatically and electrically the ECP brake equipment to make an emergency brake application. The second pressure reduction circuit assures that the railcar brake pipe pressure reduces to the emergency level when the locomotive brake pipe pressure drops below a prespecified level.

DETAILED DESCRIPTION OF THE INVENTION

Before describing the invention in detail, the reader is advised that, for the sake of clarity and understanding, identical components having identical functions have been marked where possible with the same reference numerals in each of the Figures provided in this document. Though the invention is described below as being deployed with a WABCO 26-L Pneumatic Brake Control System, it should be apparent from a reading of this document that the invention may be incorporated into various other known brake control systems. The invention, for example, may be used with certain electronic air brake control systems that feature pneumatic interfaces identical to the 26-L System. Depending on the particular brake control system with which the invention is to be used, certain modifications, of a minor and well known nature, may be necessary.

Figure 2:
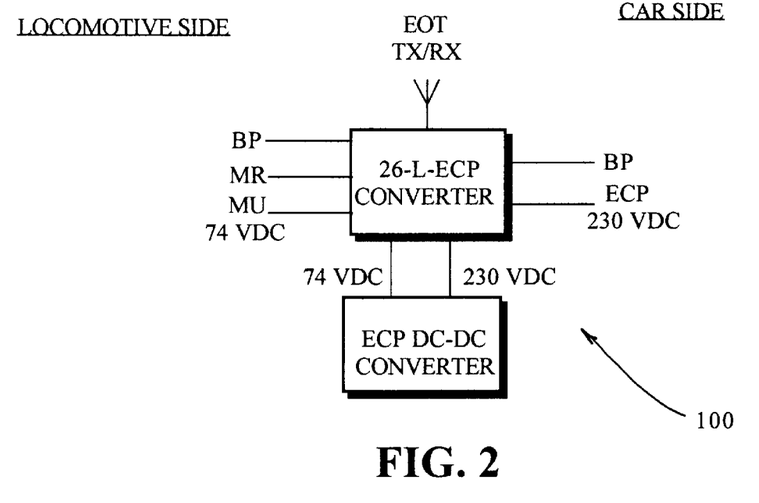
FIG. 2 is a simplified block diagram of a conversion system, according to the invention, for a conventional pneumatic brake control system of a train.
Figure 3:
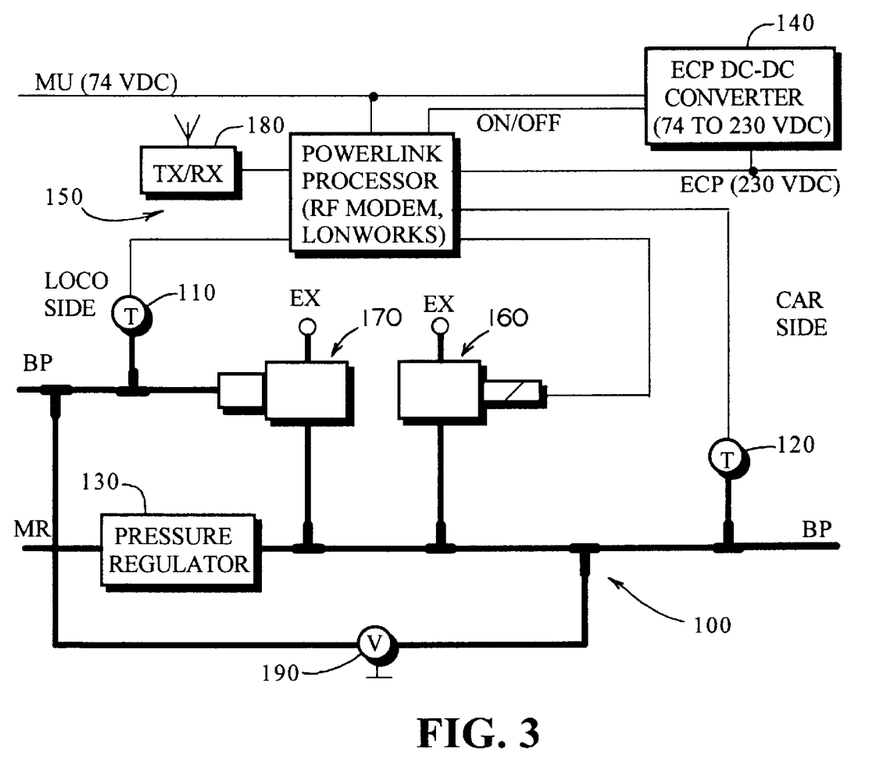
FIG. 3 is a block diagram illustrating a particular manifestation of the conversion system shown in FIG. 2.

FIGS. 2 and 3 illustrate the essential details of the invention, namely, a conversion system 100 designed to enable a locomotive equipped with a conventional pneumatic brake control system to control the brakes on railcars equipped with electrically controlled pneumatic (ECP) brake equipment. As is apparent from the figures, the conversion system 100 is intended to interconnect the 26-L Brake Control System on the controlling locomotive and the ECP brake equipment on the railcars. Preferably designed as a portable unit, the conversion system can be installed either in the last locomotive of a locomotive consist or in the first railcar of an ECP unit train.

Referring to FIG. 3, the conversion system 100 includes a first pressure transducer 110, a second pressure transducer 120, a pressure regulating mechanism 130, a dc—dc converter 140, a controller unit 150 and two pressure reduction circuits 160 and 170. The first pressure transducer 110 is used to convert pressure within the brake pipe on the locomotive to a first electrical feedback signal indicative of the locomotive brake pipe pressure. The second pressure transducer 120 is used to convert pressure within the brake pipe on the railcars to a second electrical feedback signal indicative of the pressure maintained within the brake pipe on the railcars.

The pressure regulating mechanism 130 interconnects the main reservoir equalization (MRE) pipe on the locomotive and the brake pipe on the railcars. Supplied from the MRE pipe with air maintained at approximately 130 psi, the mechanism is used to supply air to and regulate the pressure within the railcar brake pipe to a predetermined nominal level of preferably 90 psi under normal operating conditions. The pressure regulating mechanism 130 can take the form of an entirely pneumatic valve, an electropneumatic valve or one of various other means for regulating pressure known in the brake control art. Should the electropneumatic valve be preferred, the controller unit 150 can be used to control the electropneumatic valve so as to maintain the brake pipe of the railcars at the predetermined nominal level during non-emergency situations.

The dc—dc converter 140 is used to convert the battery voltage received from the locomotive to a predetermined nominal voltage with which to power the ECP trainline that runs along the railcars. Supplied from the 74V dc power and return lines of the MU line cable, the dc—dc-converter 140 converts this voltage to approximately 230V dc. This predetermined nominal voltage is used to power the ECP brake equipment on each railcar in the train in a manner well known in the brake control art.

Notwithstanding the second pressure reduction circuit 170, the controller unit 150 is used to control the overall operation of the invention. On the locomotive side of the diagram shown in FIG. 3, the controller unit connects to (i) the 74V dc power and return lines of the MU line cable from which it receives power and (ii) the brake pipe via the first pressure transducer 110. On the railcar side of the invention, the controller unit 150 connects to the brake pipe via (i) the second pressure transducer 120 and (ii) the first pressure reduction circuit 160. The controller unit 150 also connects to the dc—dc converter 140 and the 230V dc powered ECP trainline. From the locomotive brake pipe the controller unit 150 receives pneumatic service or emergency brake commands via the first pressure transducer 110. Operating according to instructions contained within its programming code, the controller unit converts these pneumatic brake commands into electrical brake commands corresponding thereto. The controller unit then transmits these electrical brake commands along the ECP trainline to operate the ECP brake equipment on the railcars. For a pneumatic emergency brake command, the conversion system 100 also provides both electropneumatic and pneumatic backups 160 and 170, respectively, to this electrical control of the ECP brake equipment. Specifically, the conversion system not only transmits the emergency brake command to the ECP brake equipment electrically via the ECP trainline, but also conveys the emergency brake command pneumatically via the railcar brake pipe as described infra. Moreover, should it lose power or otherwise fail electrically, the conversion system 100 will use only the railcar brake pipe to convey a pneumatic emergency brake command to the ECP brake equipment. It is by the 230V dc powered ECP trainline, however, that the controller unit 150 is normally able to transmit the electrical service and emergency brake commands to the railcar ECP brake equipment.

The first pressure reduction circuit 160 preferably takes the form of a solenoid operated valve that is connected to the brake pipe of the railcars. Depending on how one wishes it to be controlled, the first pressure reduction circuit 160 can be a normally open solenoid valve, a normally closed solenoid valve or even one of various other known (first) means for A reducing pressure within the railcar brake pipe. For the normally open variant, the controller unit 150 can be used to keep the solenoid valve energized, thereby normally holding the solenoid valve in the closed position. Should the controller unit detect a pneumatic emergency brake command in the locomotive brake pipe (e.g., pressure below a nominal value of approximately 30 psi) via the first pressure transducer 110, the controller unit 150 would then be used to deenergize the solenoid valve so that the railcar brake pipe can vent to atmosphere at an emergency rate. The normally open solenoid valve would also deenergize when the controller unit 150 suffered a loss of power. For the normally closed variant, the controller unit 150 can be used to energize (i.e., open) the solenoid valve when the pneumatic emergency brake command appears in the brake pipe of the locomotive.

No matter which variant is used, it is intended that the first pressure reduction circuit 160 vent the railcar brake pipe to atmosphere in response to an emergency pressure reduction in the locomotive brake pipe. Absent a loss of power, the controller unit 150 monitors the first and second feedback signals received from the pressure transducers and otherwise operates according to instructions contained in its programming code. Specifically, when the controller unit receives from the first pressure transducer 110 a first feedback signal indicating that a pneumatic emergency brake command has appeared in the brake pipe of the locomotive, the controller unit will respond as follows. First, the controller unit will transmit an electrical emergency brake command to the ECP brake equipment along the ECP trainline. The ECP brake equipment on each railcar responds to the emergency brake command in the aforementioned well known manner by making an emergency application of the brakes. Second, the controller unit 150 will also simultaneously cause the preferred solenoid valve to reduce the railcar brake pipe pressure at an emergency rate. The second feedback signal from the second pressure transducer 120 is used by the controller unit to verify this reduction in pressure. Even when the controller unit 150 suffers a loss of power, the solenoid valve will reduce the railcar brake pipe pressure to an emergency level. It is by dropping the pressure in the railcar brake pipe to the emergency level that the controller unit, either actively or upon or a loss of power, pneumatically commands the ECP brake equipment on each railcar to make an emergency application of the brakes.

The second pressure reduction circuit 170 can take the form of any one of various known (second) means by which to reduce the pressure contained within the railcar brake pipe. Preferably taking the form of an air piloted valve, the purpose for the second pressure reduction circuit is to assure that the railcar brake pipe pressure will reduce to the emergency level when locomotive brake pipe pressure drops below a prespecified level of approximately 45 psi. Specifically, the pilot port of the valve responds to a drop in locomotive brake pipe pressure below the prespecified level by causing the air piloted valve to open. When so opened, the air piloted valve vents the railcar brake pipe to atmosphere at the emergency rate. In conjunction with the solenoid operated valve 160 or even by itself, the air piloted valve 170 is able to drop the pressure in the railcar brake pipe to the emergency level and thereby pneumatically command the ECP brake equipment on each railcar to make an emergency application of the brakes. The air piloted valve 170 thus serves as a fail-safe pneumatic backup to the electronically controlled solenoid operated valve 160.

The controller unit 150 can be implemented at least partly in the form of a microcontroller package such as the POWERLINK PROCESSOR manufactured by Pulse Electronics Incorporated, a division of WABCO. Designed to operate with locomotive ECP based brake control systems, this microcontroller package features a microprocessor and a powerline modem such as the Echelon LonWorks powerline modem (PLT-10) currently required by the AAR for ECP communications. In order to operate an ECP unit train from a locomotive equipped with a conventional pneumatic brake control system, however, the microcontroller package must be extensively modified to perform the functions envisioned by this invention. The microprocessor should be adapted to receive as inputs the first and second feedback signals from the pressure transducers 110 and 120 so as to monitor the pressure in the brake pipe on both the locomotive and railcar sides of the invention. The microprocessor must also carry out the conversion of the pneumatic brake commands into their electrical counterparts and control the operation of the first pressure reduction circuit 160. It should also control operation of the dc—dc converter 140 thereby controlling when the ECP trainline is powered. Controlled by the microprocessor, the powerline modem is used to communicate ECP data to and from the railcar ECP brake equipment via the ECP trainline. The ECP data includes, of course, the electrical brake commands formulated by the microprocessor.

In its most basic embodiment, the conversion system 100 can be configured to work with a conventional pneumatic brake control system so as to operate an ECP unit train without the need to modify the hardware on the locomotive. In this basic embodiment, the end-of-train (EOT) radio telemetry system, particularly its displays, even if present, are not taken advantage of. The standard brake pipe pressure gauge is used to provide the display of the braking effort in the same manner as is done on the conventionally equipped locomotive. The difference is that the conversion system and the railcar ECP brake equipment together significantly reduce the time it takes to apply and release the brakes as compared to the conventional brake equipment. Moreover, with the locomotive brake control system set in the "passenger service" mode of operation, a graduated release of the brakes can also be accomplished quickly. Furthermore, the controller unit 150, via known means of communicating, can be linked to the alarm line of the MU line cable in the locomotive. Consequently, critical data pertaining to alarm conditions relevant to operation of the ECP brake equipment can be communicated from the controller unit 150 to the locomotive brake control system. This critical data can be communicated to the locomotive brake control system over the alarm line with a unique on/off sequence so as to be easily distinguished from the alarms initiated by the locomotive equipment. By communicating critical data over the alarm line, the train operator in the locomotive can also be made aware of critical conditions occurring in the ECP equipped railcars.

In a more enhanced embodiment, the conversion system 100 can be configured to work with a conventional pneumatic brake control system in such a way as to take advantage of the EOT radio telemetry system on the train. In this embodiment, a separate EOT transceiver 180 would be used to communicate with the locomotive control unit (LCU) of the EOT radio telemetry system. A radio modem, such as the 1200 bps FFSK model typically included as a part of the microcontroller package, would be used to code and decode outgoing and incoming radio communications, respectively, for the microprocessor. Used to link the controller unit 150 to the EOT radio telemetry system, the EOT transceiver 180 and the radio modem would be used to communicate to the LCU various data pertaining to operation of the ECP brake equipment. Examples of such data include data pertaining to diagnostics and alarm conditions relevant to operation of the railcar ECP brake equipment.

Unlike the basic embodiment, this enhanced version would require modification of the programming code executed by LCU in the locomotive. Only minor modification would be required for the EOT rear unit located on the last railcar in the train. By modifying the programming code of the LCU, the supplemental display of the LCU can be used to visually convey the diagnostic and alarm data to the train operator in the locomotive. Moreover, the LCU software could also be modified to augment the ECP data that has traditionally been shown to the train operator of a train having conventional pneumatic brake equipment. For example, one panel of the primary display of the LCU has traditionally been used to display only the brake pipe pressure on the last railcar. By appropriate modification of the LCU code, the supplemental display could be used to show the percentage that the then existing brake pipe pressure represents of the amount required for a full service application based on data accumulated from each ECP equipped railcar. The code of the EOT telemetry system could also be modified so that a set sequence of button presses could be used to setup the system for operation with the designated conversion system 100.

The microcontroller packages employed in the prior art locomotive ECP based brake control systems use programming code developed prior to my invention and according to directives issued by the AAR. This existing programming code contains algorithms and control modules that basically relate to the ECP communications discussed in the background section of this document such as transmission of electrical brake commands, ECP operational data and other diagnostic information. Various other functions, such as adjusting the electrical brake commands to compensate for railcars whose brakes have been cut-out, are also handled by the existing programming code. Consequently, the controller unit 150 of my invention can also use many of the algorithms and control modules contained within this existing programming code. In addition to the existing programming code, the controller unit 150 will also require new programming code to perform the various new functions described herein. For example, new programming code will be required for (i) monitoring of the pressure transducers 110 and 120 and processing of the first and second feedback signals (ii) conversion of the pneumatic brake commands to the corresponding electrical brake commands; (iii) control of the dc—dc converter 140 and (iv) control of the first pressure reduction circuit 160. Having disclosed my invention herein, it should be well within the abilities of one of ordinary skill in the brake control art to codify these new functions in programming code.

Illustrated in FIG. 3 is yet another feature of the invention, namely, a manual bypass valve 190. Should an emergency application of the train brakes be required, the train would be brought to a stop before the conversion system 100 could be reset. If the railcars of the train are equipped with dual ECP and pneumatic brake equipment, the manual bypass valve 190 can be used to reconnect the brake pipe of the locomotive with the brake pipe of the railcars.

The presently preferred embodiments for carrying out the invention have been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and not intended to limit any of the ensuing claims to any particular narrow interpretation.

Accordingly, to promote the progress of science and useful arts, I secure for myself by Letters Patent exclusive rights to all subject matter embraced by the following claims for the time prescribed by the Patent Act.

I claim:

1. A conversion system for enabling a locomotive equipped with a conventional brake control system to control braking on railcars having electrically controlled pneumatic (ECP) brake equipment, said conversion system comprising:
   (a) a first pressure transducer for converting pressure within a brake pipe of such locomotive to a first feedback signal indicative of locomotive brake pipe pressure;
   (b) a second pressure transducer for converting pressure within a brake pipe of such railcars to a second feedback signal indicative of railcar brake pipe pressure;
   (c) means for regulating to a predetermined nominal pressure air supplied to such brake pipe of such railcars from a main reservoir pipe of such locomotive;
   (d) a dc—dc converter for converting battery voltage received from a power trainline of such locomotive to a predetermined nominal voltage so as to power an ECP trainline of such railcars;
   (e) a controller unit, operating according to instructions contained within programming code, to monitor said first and said second feedback signals received from said pressure transducers, control said dc—dc converter and convert pneumatic brake commands conveyed by such brake pipe of such locomotive into electrical brake commands corresponding thereto for transmission along such ECP trainline and thereby control such ECP brake equipment -on such railcars and braking effort deliverable thereby;
   (f) first means, activatible by said controller unit, for reducing such railcar brake pipe pressure to an emergency level such that when a pneumatic emergency brake command appears in such brake pipe of such locomotive, said controller unit (i) activates said first means and (ii) transmits an emergency electrical brake command along such ECP trainline, thereby commanding both pneumatically and electrically such ECP brake equipment to make an emergency brake application; and
   (g) second means for assuring such railcar brake pipe pressure reduces to said emergency level when such locomotive brake pipe pressure drops below a prespecified level.

2. The conversion system, as claimed in claim 1, wherein said first means is a normally closed solenoid operated valve connected to such brake pipe of such railcars, said controller unit opens said solenoid operated valve when such pneumatic emergency brake command appears in such brake pipe of such locomotive thereby causing said solenoid operated valve to exhaust such railcar brake pipe pressure at an emergency rate.

3. The conversion system, as claimed in claim 1, wherein said first means is a normally open solenoid operated valve connected to such brake pipe of such railcars, said solenoid operated valve held closed by said controller unit unless said controller unit suffers a loss of power or such pneumatic emergency brake command appears in such brake pipe of such locomotive in which case said solenoid operated valve exhausts such railcar brake pipe pressure at an emergency rate.

4. The conversion system, as claimed in claim 1, wherein said second means is an air piloted pneumatic valve whose pilot port responds to a drop in such locomotive brake pipe pressure below said prespecified level by causing said pneumatic valve to open thereby permitting such railcar brake pipe pressure to exhaust to atmosphere at an emergency rate.

5. The conversion system, as claimed in claim 1, wherein said means for regulating includes a pressure regulating valve connected between such main reservoir pipe of such locomotive and such brake pipe of such railcars.

6. The conversion system, as claimed in claim 1, wherein said means for regulating includes:
   (a) an electropneumatic valve connected between such main reservoir pipe of such locomotive and such brake pipe of such railcars; and
   (b) said controller unit to control said electropneumatic valve so as to maintain such brake pipe of such railcars at said predetermined nominal pressure absent an emergency.

7. The conversion system, as claimed in claim 1, wherein said controller unit includes:
   (a) a powerline modem for communicating ECP data to and from such ECP brake equipment of such railcars via such ECP trainline, said ECP data including transmission of said electrical brake commands;
   (b) an EOT transceiver linked to a locomotive control unit on such locomotive for radio communication of data pertaining to diagnostics and alarm conditions relevant to operation of such ECP brake equipment;
   (c) a radio modem for coding and decoding said radio communications communicated between said EOT transceiver and such locomotive control unit; and
   (d) a microprocessor, operating according to said instructions contained within said programming code, for monitoring said pressure transducers, controlling conversion of such pneumatic brake commands into said electrical brake commands, and controlling operation of said dc—dc converter, said first means, said modems and said EOT transceiver.

8. The conversion system, as claimed in claim 1, wherein said controller unit includes:
   (a) a powerline modem for communicating ECP data to and from such ECP brake equipment of such railcars via such ECP trainline, said ECP data including transmission of said electrical brake commands;
   (b) means for communicating critical data pertaining at least to alarm conditions relevant to operation of such ECP brake equipment to such locomotive brake control system; and
   (c) a microprocessor, operating according to said instructions contained within said programming code, for monitoring said pressure transducers, controlling conversion of such pneumatic brake commands into said electrical brake commands, and controlling operation of said means for communicating, said first means, said dc—dc converter and said powerline modem.

9. The conversion system, as claimed in claim 8, wherein said means for communicating conveys said critical data to such locomotive brake control system via an alarm trainline of such locomotive.

10. The conversion system, as claimed in claim 1, further including a manual bypass valve connected between such brake pipe of such locomotive and such brake pipe of such railcars when such railcars are equipped with both such ECP brake equipment and pneumatic brake equipment.

11. A conversion system for enabling a locomotive equipped with a conventional brake control system to control braking on a train whose railcars each have electrically controlled pneumatic (ECP) brake equipment, said conversion system comprising:

(a) a first pressure transducer for converting pressure within a brake pipe of such locomotive to a first feedback signal indicative of locomotive brake pipe pressure;

(b) a second pressure transducer for converting pressure within a brake pipe of such railcars to a second feedback signal indicative of railcar brake pipe pressure;

(c) means for regulating to a predetermined nominal pressure air supplied to such brake pipe of such railcars from a main reservoir pipe of such locomotive;

(d) a controller unit to monitor said first and said second feedback signals received from said pressure transducers and to convert pneumatic brake commands conveyed by such brake pipe of such locomotive into electrical brake commands corresponding thereto for transmission along an ECP trainline of such railcars and thereby control such ECP brake equipment on each of such railcars and braking effort deliverable thereby;

(e) first means, activatible by said controller unit, for reducing such railcar brake pipe pressure to an emergency level such that when an pneumatic emergency brake command appears in such brake pipe of such locomotive, said controller unit (i) activates said first means and (ii) transmits an emergency electrical brake command along such ECP trainline, thereby commanding both pneumatically and electrically such ECP brake equipment to make an emergency brake application; and (f) second means for assuring such railcar brake pipe pressure reduces to said emergency level when such locomotive brake pipe pressure drops below a prespecified level.

12. A conversion system for enabling a locomotive equipped with a conventional brake control system to control braking on railcars having electrically controlled pneumatic (ECP) brake equipment, said conversion system comprising:

(a) a power conversion means for converting battery voltage received from a power trainline of such locomotive to a predetermined nominal voltage so as to power such ECP brake equipment of such railcars via an ECP trainline; and (b) a signal conversion means for converting pneumatic brake commands issued from such locomotive into electrical brake commands corresponding thereto for transmission along such ECP trainline thereby enabling control of such ECP brake equipment on such railcars and braking effort deliverable thereby.

13. The conversion system, as claimed in claim 12, wherein said signal conversion means includes:

(a) a first pressure transducer for converting pressure within a brake pipe of such locomotive to a first feedback signal indicative of locomotive brake pipe pressure;

(b) a second pressure transducer for converting pressure within a brake pipe of such railcars to a second feedback signal indicative of railcar brake pipe pressure;

(c) means for regulating to a predetermined nominal pressure air supplied to such brake pipe of such railcars from a main reservoir pipe of such locomotive; and (d) a controller unit, operating according to instructions contained in programming code, to monitor said first and said second feedback signals received from said pressure transducers, control said power conversion means and convert such pneumatic brake commands conveyed by such brake pipe of such locomotive into said electrical brake commands transmitted along such ECP trainline and thereby control such ECP brake equipment on such railcars and such braking effort deliverable thereby.

14. The conversion system, as claimed in claim 13, further including:

(e) a first means, activatible by said controller unit when such brake pipe in such locomotive carries a pneumatic emergency brake command, for reducing such railcar brake pipe pressure to an emergency level and thereby pneumatically commanding such ECP brake equipment to make an emergency brake application; and (g) a second means for assuring such railcar brake pipe pressure reduces to said emergency level when such locomotive brake pipe pressure drops below a prespecified level.

15. The conversion system, as claimed in claim 14, wherein said first means is a normally closed solenoid operated valve connected to such brake pipe of such railcars, said controller unit opens said solenoid operated valve when such pneumatic emergency brake command appears in such brake pipe of such locomotive thereby causing said solenoid operated valve to exhaust such railcar brake pipe pressure at an emergency rate.

16. The conversion system, as claimed in claim 14, wherein said first means is a normally open solenoid operated valve connected to such brake pipe of such railcars, said solenoid operated valve held closed by said controller unit unless said controller unit suffers a loss of power or such pneumatic emergency brake command appears in such brake pipe of such locomotive in which case said solenoid operated valve exhausts such railcar brake pipe pressure at an emergency rate.

17. The conversion system, as claimed in claim 14, wherein said second means is an air piloted pneumatic valve whose pilot port responds to a drop in such locomotive brake pipe pressure below said prespecified level by causing said pneumatic valve to open thereby permitting such railcar brake pipe pressure to exhaust to atmosphere at an emergency rate.

18. The conversion system, as claimed in claim 13, wherein said means for regulating includes a pressure regulating valve connected between such main reservoir pipe of such locomotive and such brake pipe of such railcars.

19. The conversion system, as claimed in claim 13, wherein said means for regulating includes:

(a) an electropneumatic valve connected between such main reservoir pipe of such locomotive and such brake pipe of such railcars; and (b) said controller unit to control said electropneumatic valve so as to maintain such brake pipe of such railcars at said predetermined nominal pressure absent an emergency.

20. The conversion system, as claimed in claim 13, wherein said controller unit includes:

(a) a powerline modem for communicating ECP data to and from such ECP brake equipment of such railcars via such ECP trainline, said ECP data including transmission of said electrical brake commands;

(b) an EOT transceiver linked to a locomotive control unit on such locomotive for radio communication of data pertaining to diagnostics and alarm conditions relevant to operation of such ECP brake equipment;

(c) a radio modem for coding and decoding said radio communications communicated between said EOT transceiver and such locomotive control unit; and (d) a microprocessor, operating according to said instructions contained in said programming code, for monitoring id said pressure transducers, controlling conversion of such pneumatic brake commands into said electrical brake commands, and controlling operation of said power conversion means, said powerline and said radio modems and said EOT transceiver.

21. The conversion system, as claimed in claim 13, wherein said controller unit includes:

(a) a powerline modem for communicating ECP data to and from such ECP brake equipment of such railcars via such ECP trainline, said ECP data including transmission of said electrical brake commands;

(b) means for communicating critical data pertaining at least to alarm conditions relevant to operation of such ECP brake equipment to such locomotive brake control system; and (c) a microprocessor, operating according to said instructions contained within said programming code, for monitoring said pressure transducers, controlling conversion of such pneumatic brake commands into said electrical brake commands, and controlling operation of said means for communicating, said modem and said power conversion means.

22. The conversion system, as claimed in claim 21, wherein said means for communicating conveys said critical data to such locomotive brake control system via an alarm trainline of such locomotive.

23. The conversion system, as claimed in claim 12, further including a manual bypass valve connected between such brake pipe of such locomotive and such brake pipe of such railcars when such railcars are equipped with both such ECP brake equipment and pneumatic brake equipment.

* * * * *